US009225562B2

(12) United States Patent
Mayer et al.

(10) Patent No.: US 9,225,562 B2
(45) Date of Patent: Dec. 29, 2015

(54) DIGITAL WIDEBAND CLOSED LOOP PHASE MODULATOR WITH MODULATION GAIN CALIBRATION

(75) Inventors: Thomas Mayer, Linz (AT); Thomas Bauernfeind, Arbing (AT); Christian Wicpalek, Puchenau (AT)

(73) Assignee: Intel Deutschland GmbH, Neubiberg (DE)

( * ) Notice: Subject to any disclaimer, the term of this patent is extended or adjusted under 35 U.S.C. 154(b) by 602 days.

(21) Appl. No.: 13/405,583

(22) Filed: Feb. 27, 2012

(65) Prior Publication Data

US 2013/0223564 A1  Aug. 29, 2013

(51) Int. Cl.
| | | |
|---|---|---|
| H04L 27/12 | (2006.01) | |
| H04L 25/03 | (2006.01) | |
| H04L 27/20 | (2006.01) | |

(52) U.S. Cl.
CPC ...... *H04L 25/03343* (2013.01); *H04L 27/2032* (2013.01)

(58) Field of Classification Search
CPC ...... H03C 3/00; H03C 3/0908; H03C 3/0975; H03C 3/0991; H04B 1/0483; H04L 27/20; H04L 27/361; H04L 27/2626; H04L 27/12
USPC .......................................... 375/296, 302, 308
See application file for complete search history.

(56) References Cited

U.S. PATENT DOCUMENTS

| | | | |
|---|---|---|---|
| 5,159,292 A | 10/1992 | Canfield et al. | |
| 6,008,703 A | 12/1999 | Perrott et al. | |
| 6,377,091 B1 | 4/2002 | Williams et al. | |
| 7,826,581 B1 | 11/2010 | Prather et al. | |
| 8,446,191 B2 * | 5/2013 | Dunworth et al. | 327/156 |
| 2003/0053564 A1 | 3/2003 | Kim et al. | |
| 2003/0118143 A1 * | 6/2003 | Bellaouar et al. | 375/376 |
| 2005/0047520 A1 * | 3/2005 | Yang et al. | 375/296 |
| 2005/0135472 A1 | 6/2005 | Higashino | |
| 2005/0168297 A1 | 8/2005 | Gomez | |
| 2007/0085623 A1 | 4/2007 | Staszewski et al. | |
| 2008/0095269 A1 * | 4/2008 | Frantzeskakis et al. | 375/302 |
| 2010/0272222 A1 | 10/2010 | Mitani et al. | |
| 2011/0133794 A1 | 6/2011 | Dunworth et al. | |
| 2011/0156783 A1 * | 6/2011 | Pavlovic et al. | 327/159 |

FOREIGN PATENT DOCUMENTS

| | | |
|---|---|---|
| CN | 1420653 A | 5/2003 |
| CN | 101094209 A | 12/2007 |

OTHER PUBLICATIONS

Kim, D.-S. et al.; A 0.3-1.4 GHz All-Digital Fractional-N PLL with Adaptive Loop Gain Controller, In, IEEE Journal of Solid-State Circuits, vol. 45, Issue 11, pp. 2300-2311, Nov. 2010.

* cited by examiner

*Primary Examiner* — Shuwang Liu
*Assistant Examiner* — David S Huang
(74) *Attorney, Agent, or Firm* — Eschweiler & Associates, LLC (57) ABSTRACT

One embodiment of the present invention relates to a modulation system having a phase locked loop and an adaptive control. The phased lock loop is configured to receive an input signal and an adaptive signal. The input signal is an unmodulated signal, such as a phase component or phase signal. The phase locked loop is also configured to provide an error signal and an output signal. The error signal indicates one or more modulation errors. The output signal is a modulated version of the input signal that has been corrected using the adaptive signal to mitigate the one or more modulation errors.

17 Claims, 5 Drawing Sheets

DIGITAL WIDEBAND CLOSED LOOP PHASE MODULATOR WITH MODULATION GAIN CALIBRATION

BACKGROUND

Modern communication systems utilize various modulation techniques to transfer information. Some examples of common modulation techniques include frequency modulation (FM), amplitude modulation (AM), phase modulation (PM), and the like. Frequency modulation is a form of modulation that conveys information over a carrier wave by varying its instantaneous frequency. Phase modulation is a form of modulation that represents information as variations of an instantaneous phase of a carrier wave.

One factor for the various modulation techniques, including phase modulation, is the range of frequencies used. The range of frequencies is typically referred to as bandwidth. One variation is narrowband bandwidth, typically used for some radio transmission systems. Narrowband uses a relatively narrow range of frequencies. Another variation is wideband bandwidth, typically used for FM broadcasting of music and speech. Wideband uses a relatively wider range of frequencies, but can have lower signal to noise ratios.

DETAILED DESCRIPTION

The present invention includes methods and systems to facilitate polar modulator characteristics, including linearity and gain for wideband phase modulation.

One embodiment of the present invention relates to a modulation system having a phase locked loop and an adaptive control. The phased lock loop is configured to receive an input signal and an adaptive signal. The input signal is an unmodulated signal, such as a phase component or phase signal. The phase locked loop is also configured to provide an error signal and an output signal. The error signal indicates one or more modulation errors. The output signal is a modulated version of the input signal that has been corrected using the adaptive signal to mitigate the one or more modulation errors.

Another embodiment of the invention relates to a modulation system. The system includes a phase detector, a loop filter, a digital controlled oscillator, a phase shift component, and an adaptive control. The phase detector is configured to receive a reference clock and a feedback signal at first and second inputs and generates a phase detector output from the inputs. A loop filter is configured to receive the phase detector output and generates a modulation error signal. The modulation error signal includes one or more modulation errors, such as distortions, gain errors, and phase errors. The digital controlled oscillator is configured to receive the modulation error signal and provides an oscillator output signal. The phase shift component is configured to receive the oscillator output signal and shift the phase at least partially according to an adaptive gain control signal and to provide a modulated output signal. In one example, the modulated output signal is a phase modulated output signal. The adaptive control is configured to receive the error signal and generate the adaptive control signal at least partially according to the error signal. The adaptive control can determine or identify one or more modulation errors from the error signal and generate the adaptive control signal in order to mitigate the identified modulation error(s).

Another embodiment of the invention relates to a method for mitigating modulation errors. An input signal is provided. The input signal is an unmodulated signal, such as a phase component or phase signal. One or more modulation error signals are obtained from the input signal. The one or more modulation error signals can include modulation errors including, but not limited to, gain errors, linearity errors, phase distortion, and the like. A modulation error amount is determined from the one or more modulation error signals. The modulation error amount can include error amounts for gain errors, linearity errors, phase distortions, and the like. An adaptive adjustment is determined according to the determined modulation error. The adaptive adjustment is a value or control signal that mitigates or compensates for the determined modulation error. the adaptive adjustment is then applied to a modulated output signal to mitigate the identified or determined modulation error.

Polar modulators utilize phase modulation as part of the modulation mechanism. Some communication standards, including advanced cellular standards, Universal Mobile Telecommunications System (UMTS), Long Term Evolution (LTE), require wideband phase modulation. However, the use of wideband frequencies can make it challenging to provide important communication parameters that facilitate signal quality. These parameters include timing accuracy, linearity, and gain.

Figure 1:
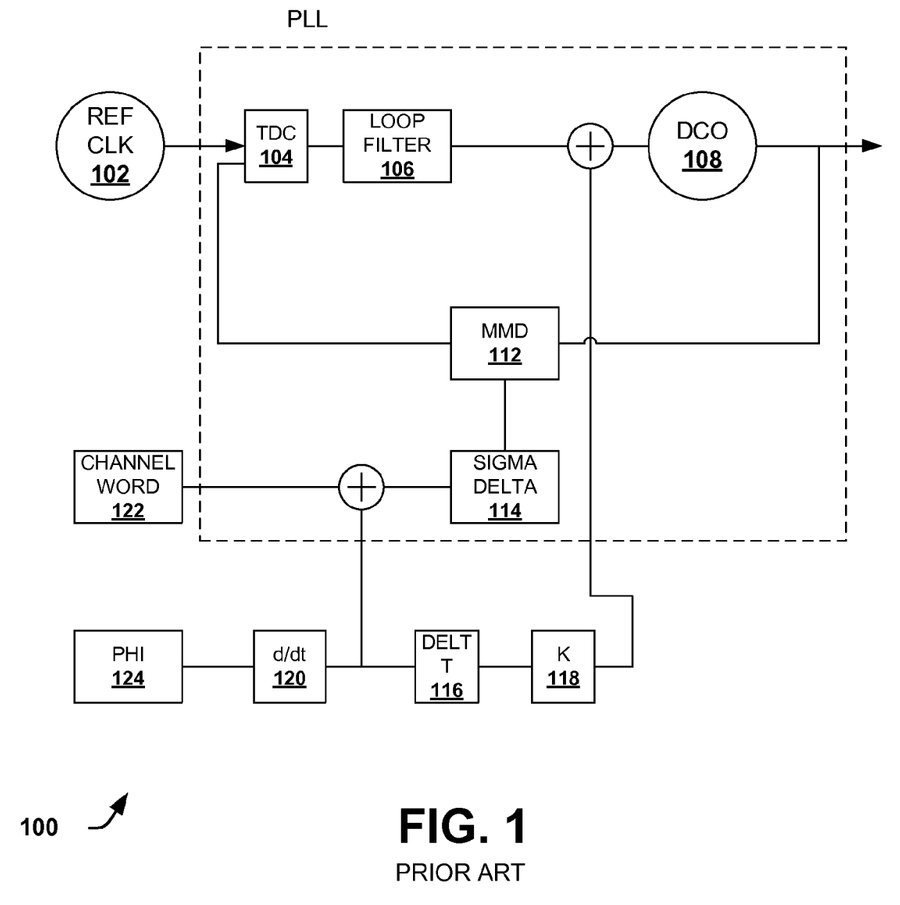
FIG. 1 is a conventional polar modulator based system.

FIG. 1 is a conventional polar modulator based system 100. The system 100 is shown to illustrate the challenge of linearity for wideband phase modulation. The system 100 includes a reference clock 102, a time to digital converter (TDC) 104, a loop filter 106, a digital controlled oscillator (DCO) 108, a multiple divider component (112), a sigma delta component 114, a channel word 122, a K component 118, a delta time (T) component 116, a d/dt component 120, and a phi component 124.

This system 100, like conventional polar modulators, uses the DCO 108 inside a digital PLL to apply the phase modulation signal to the RF carrier. However, the DCO 108 uses a LC tank to set and adjust frequencies. The LC tank is typically adjusted by linearly changing the capacitance of the LC tank. The, the typical LC tank has non-linear tuning characteristics. LC-tank:

$$f = \frac{1}{2\pi\sqrt{LC}}$$

with $$C = C_{FIX} + y_{TUNE} C_{VAR}$$

Where $C_{FIX}$ is a fixed capacitance, $C_{VAR}$ is a switchable unit capacitance and $y_{TUNE}$ is the tuning value, i.e. the number of switched on unit capacitors.

Wideband communications, including wideband cellular signals, require a wide tuning range, which increase the effect of the tuning nonlinearity. The non-linearity can lead to distortions and degrade the signal quality output by the system 100. The distortions can result in the output signal violating spectrum and error vector magnitude (EVM) limits specified in cellular standards.

One technique to mitigate nonlinearity for wideband phase modulation is digital linearization of a digital tuning input by applying an inverse nonlinearity before the DCO. Another technique to mitigate nonlinearity for wideband phase modulation is scaling of DCO varactors (LC tank) in order to compensate for non-linearity. However, these techniques show limitations when the frequency range to be linearized is relatively large. For example, system simulations show for LTE 20 MHz bandwidth a tuning range of 200 MHz has to be covered at an oscillation frequency of about 4 GHz. This leads to substantial non-linearity in the tuning characteristic. Compensation for the nonlinearity is required to be very accurate in order to remove all of the nonlinearity.

Another technique to mitigate nonlinearity for wideband communications is to apply the modulation after the PLL by using either different DCO output phases or a delay-line based Digital-to-time Converter (DTC). However, the use of different phases results in relatively high phase quantization errors because only a limited number of phases can be generated, thus the phase step between adjacent phases is relatively large. Generally, a DTC has a smaller inherent nonlinearity compared to a DCO when used on a delay line. However, the phase modulation gain of the DTC needs to be very accurate or the phase error and EVM can degrade the output signal quality or even violate specifications for a communication standard. One technique to control the gain is to control unit delay elements of the DTC in a delay locked loop (DLL). This provides a more accurate DTC gain, but at the cost of high noise and power consumption of delay cells that perform the required control.

Figure 2:
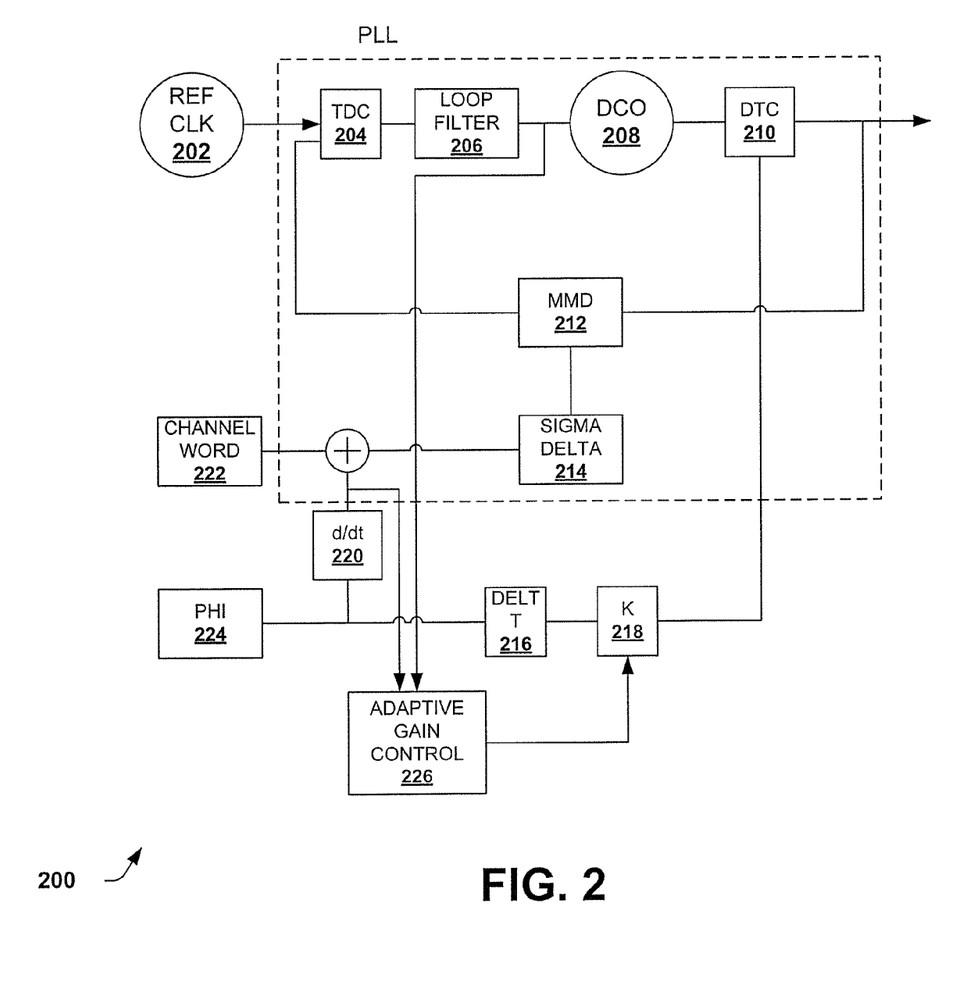
FIG. 2 is a phase modulation system in accordance with an embodiment of the invention.

FIG. 2 is a phase modulation system 200 in accordance with an embodiment of the invention. The system 200 facilitates linearity and gain control by extending the digital PLL and applying adaptive gain control. The system 200 is provided in a simplified manner and omits elements in order to facilitate understanding of the invention.

The system 200 includes a reference clock 202, a time to digital converter (TDC) 204, a loop filter 206, a digital controlled oscillator (DCO) 208, a digital to time converter (DTC) 210, a multiple divider component 212, a sigma delta component 214, a channel word 222, a K component 218, a delta time (T) component 216, a d/dt component 220, a phase signal 224, and an adaptive gain control component 226.

The reference clock 202 is provided as a first input to the TDC component 204, which can also be referred to as a phase detector. An output of the divider component 212 is provided as feedback to a second input to the TDC component 204. An output of the TDC component is provided to the loop filter 206. An output of the loop filter 206 is provided to the DCO 208 and the adaptive gain control 226. In one example, the loop filter 206 is a low pass filter. In another example, the loop filter 206 output signal is referred to as an error signal and indicates disturbances, distortions, variations, and the like.

An output of the DCO 208 is provided to the DTC component 210. An output of the K component 218 is provided as a control input to the DTC component 210. An output of the DTC component 210 is provided as a phase modulated output signal and is also provided to the divider component 212, which provides the feedback to the TDC component.

The DTC component 210 performs a programmable shift of the DCO 208 output according to the control input. The shifted phase is fed back to the divider component 212, where the phase modulation is effectively subtracted. The divider component 212, also referred to as a multi-modulus divider, changes the frequency of its input signal.

The phase signal 224 is provided to the d/dt component 220, also referred to as a differentiator block and the delta T component 216. The differentiator block 220 converts the phase signal 224 to a frequency modulation signal. An output of the Delta T component 216 is provided to the K component 218, which is also referred to as a digital multiplier or gain block. The K component 218 essentially multiplies the input signal with a programmable gain. The programmable gain, is provided by the adaptive gain control 226, as described below. The channel word 222 is provided to the sigma delta component 214. The sigma delta component 214 controls the divider component 212

The adaptive gain control 226 receives the frequency modulation signal from the differentiator block 220 as a first input. In alternate embodiments, the adaptive gain control receives the phase signal 224 as the first input. The output of the loop filter 208 is provided to the adaptive gain control 226 as a second input. The output of the loop filter 208 represents modulation error. In another example, an output of the TDC component 204 is used as the second input and represents a phase detector signal. The adaptive gain control 226 generates a gain control output, which is provided to the K component 218 and serves as the programmable gain for the K component 218.

The adaptive gain control 226 generates the gain control output according to the frequency modulation signal and the modulation error. The gain control output adjusts or configures the control input to the DTC component 210 to adjust the digital gain. Thus, the gain control output is generated in order to mitigate modulation error and is based on the frequency modulation signal and the modulation error signal received, in this example, as the output of the loop filter 206.

Placing the DTC component 210, which operates as a programmable phase shift block, after the DCO 208 permits applying phase modulation to the PLL output signal. In conventional open loop modulators the un-modulated oscillator output is used as PLL feedback. Instead, the present invention utilizes the output of the DTC component 210 as PLL feedback. This permits detection of modulation errors by monitoring internal signals of the PLL, such as phase detector signals, loop filter signals, and the like.

It is appreciated that other systems with varied components and functions are contemplated and in accordance with the invention. For example, PLLs with digital phase or frequency modulation can be utilized in accordance with the invention. For example, digital PLLs without a feedback divider, analog PLLs with digital phase/frequency modulation, and the like can be utilized in the present invention.

In another example, a DCO having multiple phase outputs is utilized instead of the DCO 208 and the DTC 210 in order to provide phase shifting. In this example, The DCO includes four phases shifted by 0, 90, 180 and 270 degrees and a multiplexer to select the signal whose phase shift fits or fits best to the actual modulation signal.

A suitable technique can be utilized to generate and/or provide adaptive control. An example of a suitable technique is provided below.

Figure 3:
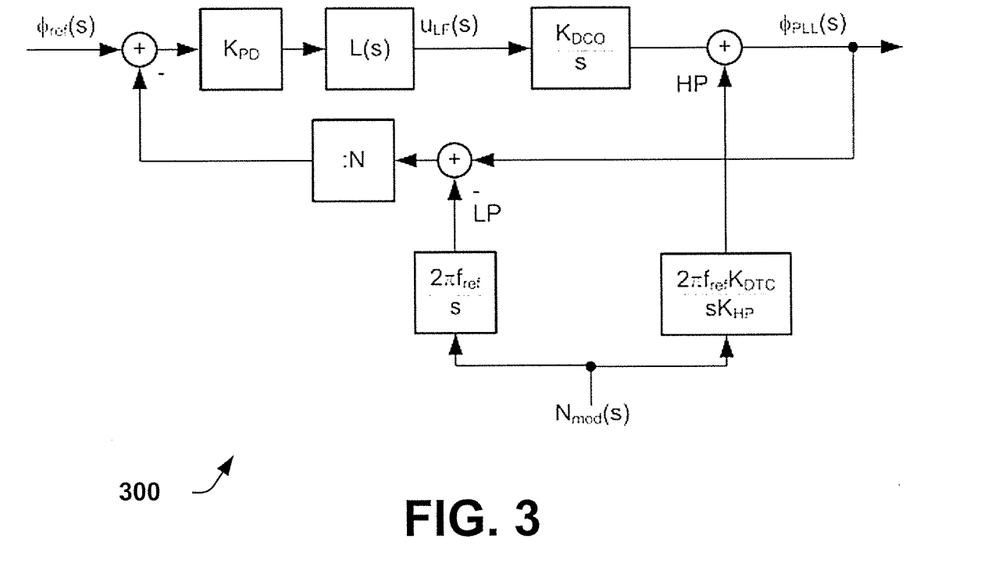
FIG. 3 is a linear model of a DTC based phase modulator in accordance with an embodiment of the invention.

FIG. 3 is a linear model 300 of a DTC based phase modulator in accordance with an embodiment of the invention. The DTC based phase modulator includes modulation systems, such as the system 200 described above and in FIG. 2.

A mismatch in the gain of modulation data applied at the high-pass point ($K_{HP}$) of the PLL (HP) and the gain of the DTC ($K_{OTC}$) can be observed at a loop filter output or an output of the TDC (first line below). This enables the adjustment of the modulation data gain at the high-pass point ($K_{HP}$) by means of adaptive control mechanisms (LMS, RLS, Kalman Filtering, ...) in such a way that the actual gain of the DTC ($K_{DTC}$) is properly compensated.

$$G(s) = \frac{K_{PD}L(s)}{sN + K_{DCO}K_{PD}L(s)}$$

$$u_{LF,LP} = N_{mod} + 2\pi f_{ref} G(s)$$

$$u_{LF,HP} = -G(s) 2\pi f_{ref} N_{mod} \frac{K_{DTC}}{K_{HP}}$$

$$u_{LF,N_{mod}} = u_{LF,LP} + u_{LF,HP} = 2\pi f_{ref} N_{mod} G(s) \left(1 - \frac{K_{DTC}}{K_{HP}}\right)$$

The last line of the equation shows the impact of the modulation data gain mismatch on the loop filter output for a system, such as system 200 of FIG. 2.

The above is shown as an example to facilitate an understanding of the present invention. It is appreciated that other suitable techniques can be employed in accordance with the present invention to mitigate or compensate for modulation errors and/or parameters that impact output signal quality.

Figure 4:
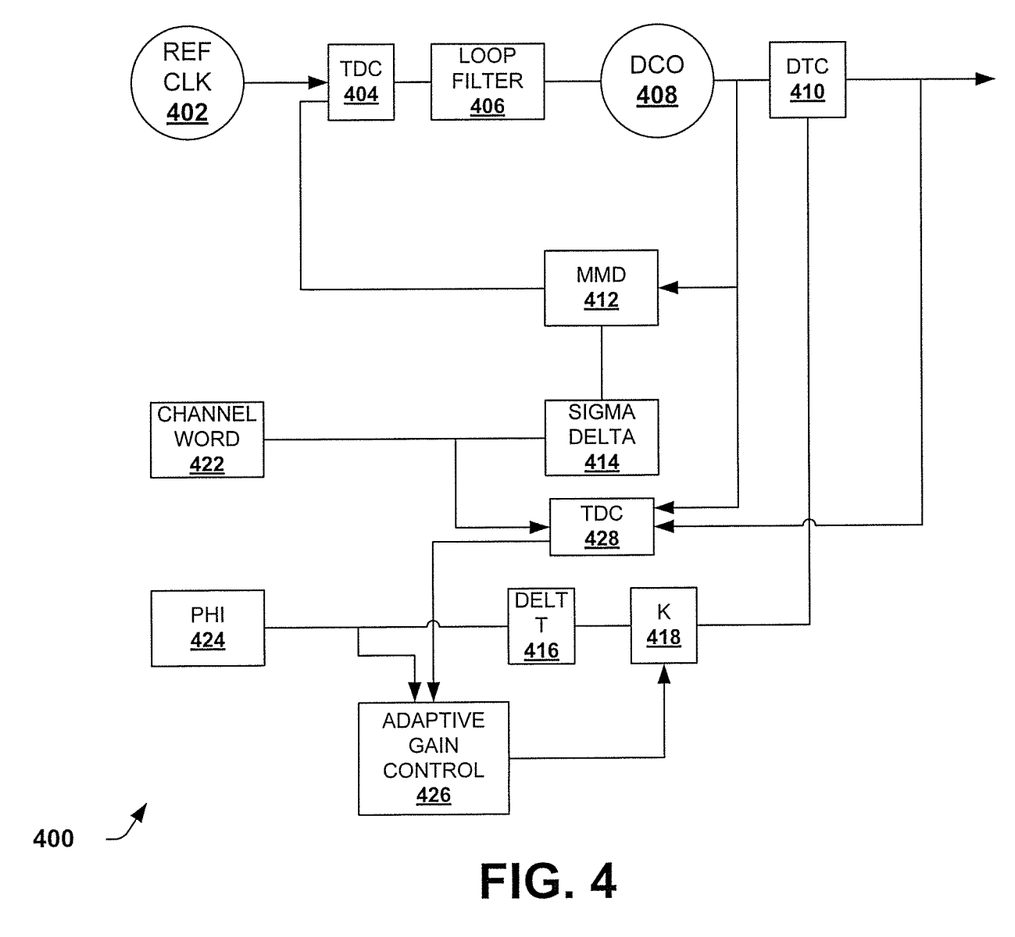
FIG. 4 is another phase modulation system in accordance with an embodiment of the invention.

FIG. 4 is another phase modulation system 400 in accordance with an embodiment of the invention. The system 400 facilitates linearity and gain control by extending the digital PLL and applying adaptive gain control. The system 400 includes a reference clock 402, a first time to digital converter (TDC) 404, a loop filter 406, a digital controlled oscillator (DCO) 408, a digital to time converter (DTC) 410, a multiple divider component 412, a sigma delta component 414, a channel word 422, a K component 418, a delta time (T) component 416, a phase signal 424, a second time to digital converter (TDC) 428, and an adaptive gain control component 426.

The reference clock 402 is provided as a first input to the first TDC component 404. An output of the divider component 412 is provided as feedback to a second input to the TDC component 404. The divider component 412, also referred to as a multi-modulus divider, changes the frequency of the feedback signal. An output of the TDC component is provided to the loop filter 406, which filters its input signal and provides a loop filter output. In one example, the loop filter 206 is a low pass filter. In another example, the loop filter 206 output signal is referred to as an error signal and indicates disturbances, distortions, variations, and the like. The loop filter output is provided to the DCO 408 as an input. DCO 408 generates an oscillator signal as a DCO output based on its input, which here is the loop filter output.

The DCO output of the DCO 408 is provided to the DTC component 410, the divider component 412, and the second TDC 428. An output of the K component 418 is provided as a control input to the DTC component 410. An output of the DTC component 410 is provided as a phase modulated output signal and is also provided to the second TDC component 428.

The DTC component 410 performs a programmable shift of the DCO 408 output according to the control input.

The phase signal 424 is provide to the delta T component 416 and the adaptive gain control 426. An output of the Delta T component 416 is provided to the K component 418, which is also referred to as a digital multiplier or gain block. The K component 418 essentially multiplies the input signal with a programmable gain. The programmable gain is provided by the adaptive gain control 426, as described below. The channel word 422 is provided to the sigma delta component 414 and the second TDC 428. The sigma delta component 414 provides a control signal to the divider component 412.

The adaptive gain control 426 receives the phase signal 424 as a first input and an error signal as a second input. The error signal includes an output of the second TDC 428. The error signal, in this example, represents a time delay between DTC 410 output signal edges and DCO 408 output signal edges. By using the information of the original phase signal 424 by the adaptive gain control 426, the modulation error can be determined and mitigated.

The adaptive gain control 426 generates the gain control output according to phase signal 424 and the error signal, as shown above. The gain control output is provided to the K component 418 and serves as the programmable gain for the K component 418. Thus, the gain control output is generated in order to mitigate modulation error and is based on the phase signal 424 and the error signal, which in this example is the output of the second TDC 428. However, it is appreciated that alternate embodiments of the invention can incorporate other modulation related errors or distortions into the error signal instead of or in addition to that which is described above.

Figure 5:
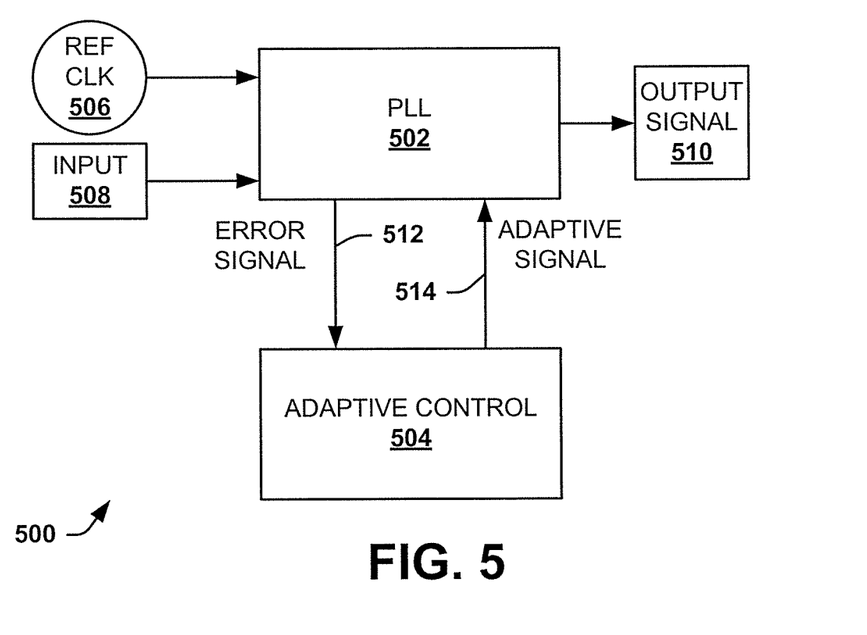
FIG. 5 is a block diagram of a modulation system utilizing an adaptive control mechanism in accordance with an embodiment of the present invention.

FIG. 5 is a block diagram of a modulation system 500 utilizing an adaptive control mechanism in accordance with an embodiment of the present invention. The system 500 includes a PLL 502 and an adaptive control 504 and facilitates modulation by performing adjustments based on internal signals from the PLL 502.

The PLL 502 receives inputs including a reference clock 506 and an input signal 508 to be modulated. Other signals and/or information can be input such as, a channel word and the like. The input signal 508 can include a phase signal as part of a polar modulation system. However, it is appreciated that other signals can be included as the input signal besides the phase signal. The PLL 502 provides a modulated output signal 510 as an output. The modulated output signal 510 is derived from the input signal 508 and can be transmitted or undergo additional signal processing thereafter.

The PLL 502 includes a plurality of internal signals including, but not limited to, phase detector output, loop filter output, and the like. One or more of the internal signals are provided as an error signal 512. An adaptive signal 514 is received as a control signal, and provides adjustments based on the error signal 512. In one example, the adaptive signal 514 is utilized to perform phase shift adjustments on the output signal 510.

The adaptive control 504 receives the error signal 512 and generates the adaptive signal 514 there from. As stated above, the error signal 512 includes one or more internal signals from the PLL. The adaptive control 504 generates the adaptive signal 514 according to the error signal 512 to mitigate errors including, but not limited to, gain error (as shown above), linearity error, phase offset, phase distortion due to parasitic coupling of a known signal (e.g., the instantaneous power of a transmit signal), and the like.

Figure 6:
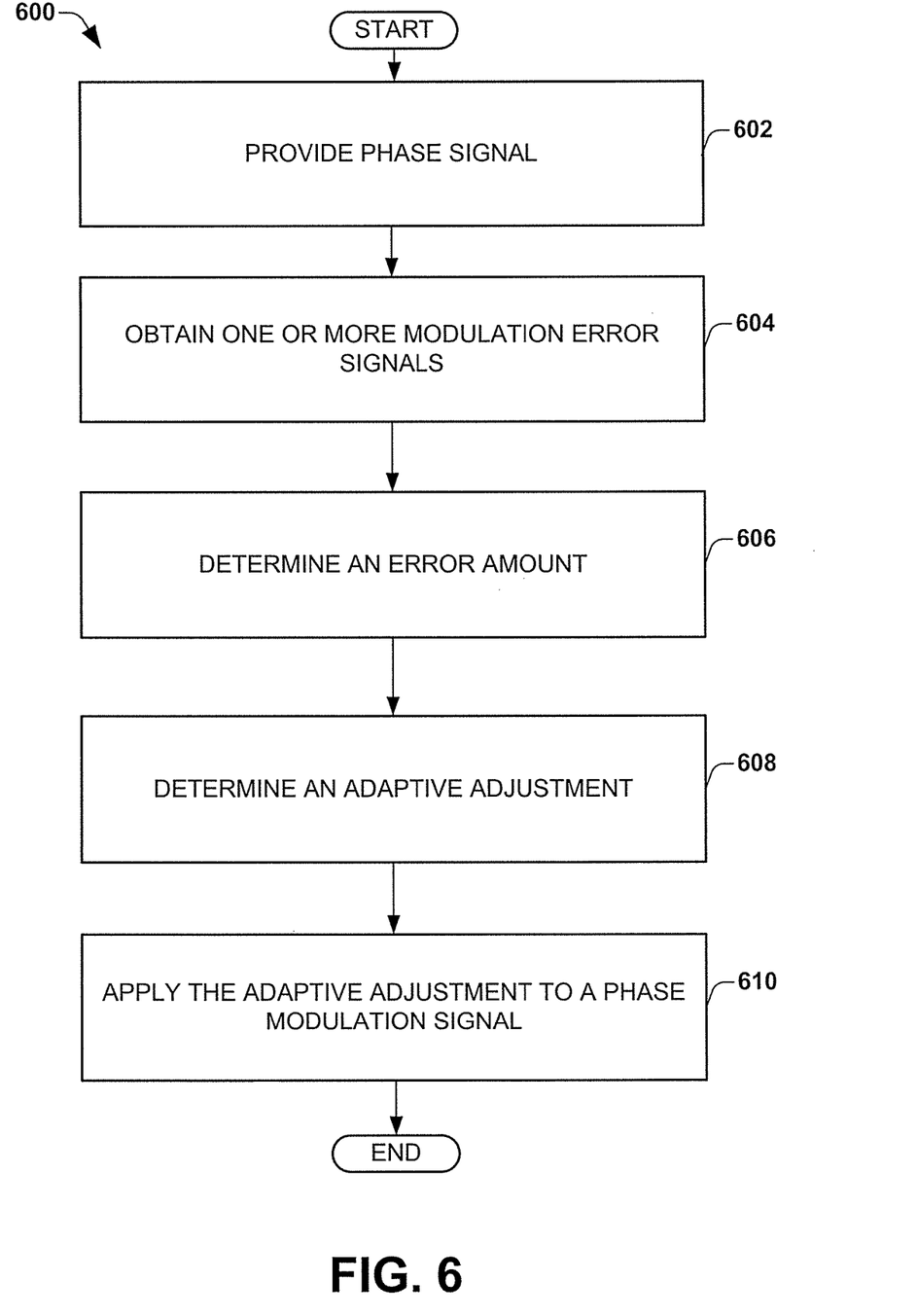
FIG. 6 is a flow diagram illustrating a method to mitigate modulation errors in accordance with an embodiment of the invention.

FIG. 6 is a flow diagram illustrating a method 600 to mitigate modulation errors in accordance with an embodiment of the invention. The method 600 mitigates or compensates for errors in a modulation system, such as the systems shown above. The method 600 mitigates the errors by generating one or more adaptive control signals based on internal signals or feedback from a modulation system.

The method begins at block 602, wherein a phase signal is provided. The phase signal can be one signal of a multi signal modulation system, such as a polar modulation signal that utilizes phase modulation and amplitude modulation to generate an amplitude modulation signal and a phase modulation signal. The generated signals can then be transmitted or otherwise communicated to convey the information contained therein. In an alternate method, a frequency signal is provided and utilized in place of the phase signal. The frequency signal can be derived from the phase signal as shown above.

One or more modulation error signals are obtained at block 604. The error signals can include one or more of the following, phase detector output, loop filter output, DTC based phase detector output, and the like. The error signals can represent, for example, linearity error, gain error, phase offset, and the like. The error signals, in one example, are obtained from internal signals of a digital PLL.

An error amount is determined at block 606 according to the error signals. The error amount can include linearity error, gain error, phase offset, phase distortion, power induced phase distortions, and the like. The error amount can be estimated or calculated.

An adaptive adjustment is determined at block 608 according to the determined error amount. The adaptive adjustment can mitigate or compensate for the determined error amount. The adaptive adjustment can vary over time and includes adjustments for linearity, gain, phase offset, phase distortion, and the like.

The adaptive adjustment is applied to a phase modulation signal at block 610 in order to mitigate the determined error amount. The adaptive adjustment can include phase shifting, gain adjustments, and the like. In one example, the adaptive adjustment includes providing a gain adjustment signal to a DTC component, such as shown in FIG. 2, described above.

While the above method 600 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

In particular regard to the various functions performed by the above described components or structures (assemblies, deices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A modulation system comprising:
   a phase locked loop configured to receive an input signal generate an error signal and an output signal;
   a digital to time converter configured to phase shift the output signal according to an adaptive signal;
   an adaptive control configured to receive the error signal from the phase locked loop and to provide the adaptive signal to the digital to time converter; and
   wherein the adaptive control signal is configured to generate the adaptive signal according to the error signal, wherein the adaptive signal generated by the adaptive control is a control signal and mitigates gain errors for the digital to time converter component of the phase locked loop.

2. The system of claim 1, wherein the input signal is an unmodulated phase signal.

3. The system of claim 1, wherein the output signal is a corrected phase modulated signal.

4. The system of claim 1, wherein the error signal comprises one or more of a phase detector output, a loop filter output, and a digital to time converter based phase detector output.

5. The system of claim 1, wherein the error signal is an internal signal of the phase locked loop.

6. The system of claim 1, wherein the control signal mitigates non-linearity.

7. The system of claim 1, wherein the adaptive control is configured to receive a frequency signal and to generate the adaptive signal according to the error signal and the frequency signal.

8. The system of claim 1, wherein the adaptive control is configured to receive a phase signal and to generate the adaptive signal according to the error signal and the phase signal.

9. A phase modulation system comprising:
   a phase detector configured to receive a reference clock and a feedback signal and to generate a phase detector output;
   a loop filter configured to receive the phase detector output and generate a modulation error signal;
   a digital controlled oscillator configured to receive the modulation error signal and provide an oscillator output signal;
   a phase shift component configured to receive the oscillator output signal and shift a phase at least partially according to an adaptive gain control signal and provide a modulated output signal; and
   an adaptive control configured to receive the error signal and to generate the adaptive gain control signal at least partially according to the error signal.

10. The system of claim 9, wherein the modulation error signal represents gain error.

11. The system of claim 9, wherein the adaptive control signal mitigates gain error.

12. The system of claim 9, wherein the phase shift component is a digital to time converter.

13. The system of claim 9, wherein the phase shift component comprises a plurality of phase shifts coupled to a multiplexer, the multiplexor controlled by the adaptive control signal.

14. The system of claim 9, wherein the modulated output signal is a phase modulated signal.

15. The system of claim 9, wherein the phase detector is a time to digital component and is configured to generate a second error signal and provide the second error signal to the adaptive control.

16. A method for mitigating modulation errors, the method comprising:
   obtaining one or more modulation error signals;
   determining a modulation error amount according to the one or more modulation error signals;

determining an adaptive adjustment according to the determined modulation error and a phase signal; and applying the adaptive adjustment to a digital to time converter component of a phase locked loop to phase shift an output signal of an oscillator and mitigate the determined modulation error, wherein applying the adaptive adjustment compensates a gain for the digital to time converter.

17. The method of claim 16, wherein the one or more modulation error signals represent at least one of linearity error, gain error, and phase distortion.

* * * * *